United States Patent
Yuki

(10) Patent No.: US 9,013,739 B2
(45) Date of Patent: Apr. 21, 2015

(54) INFORMATION PROCESSING SYSTEM, IMAGE FORMING APPARATUS, MANAGEMENT APPARATUS, INFORMATION PROCESSING METHOD, AND COMPUTER PROGRAM FOR AUTOMATICALLY DETERMINING WHETHER AN APPLICATION IS TO BE APPLIED IN RESPONSE TO CHANGE IN CONFIGURATION INFORMATION

(75) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/538,639

(22) Filed: Jun. 29, 2012

(65) Prior Publication Data

US 2013/0010329 A1 Jan. 10, 2013

(30) Foreign Application Priority Data

Jul. 4, 2011 (JP) ................................. 2011-147977

(51) Int. Cl.
*G06K 15/02* (2006.01)
*G06F 21/10* (2013.01)
*G06F 21/60* (2013.01)

(52) U.S. Cl.
CPC .............. *G06F 21/10* (2013.01); *G06F 21/608* (2013.01)

(58) Field of Classification Search
USPC ....................................................... 358/1.15
See application file for complete search history.

(56) References Cited

U.S. PATENT DOCUMENTS

| 5,745,879 A | 4/1998 | Wyman |
| 5,917,912 A | 6/1999 | Ginter |
| 2011/0004945 A1* | 1/2011 | Kurokawa ........................ 726/30 |

FOREIGN PATENT DOCUMENTS

| CN | 100365535 C | 1/2008 |
| JP | 2004-5419 A | 1/2004 |

* cited by examiner

*Primary Examiner* — Qian Yang
(74) *Attorney, Agent, or Firm* — Canon USA Inc. IP Division

(57) ABSTRACT

A device management module acquires the configuration information from the image forming apparatus and acquires product information of a product that corresponds to the image forming apparatus. The device management module determines whether the condition for validating the application that corresponds to the above-described product in the image forming apparatus is satisfied based on the acquired configuration information and the acquired product information. If the condition is satisfied, the device management module transmits license issuance request information to the image forming apparatus. The image forming apparatus transmits a license issuance request to the device management module to acquire a license and validates the application based on the acquired license.

7 Claims, 13 Drawing Sheets

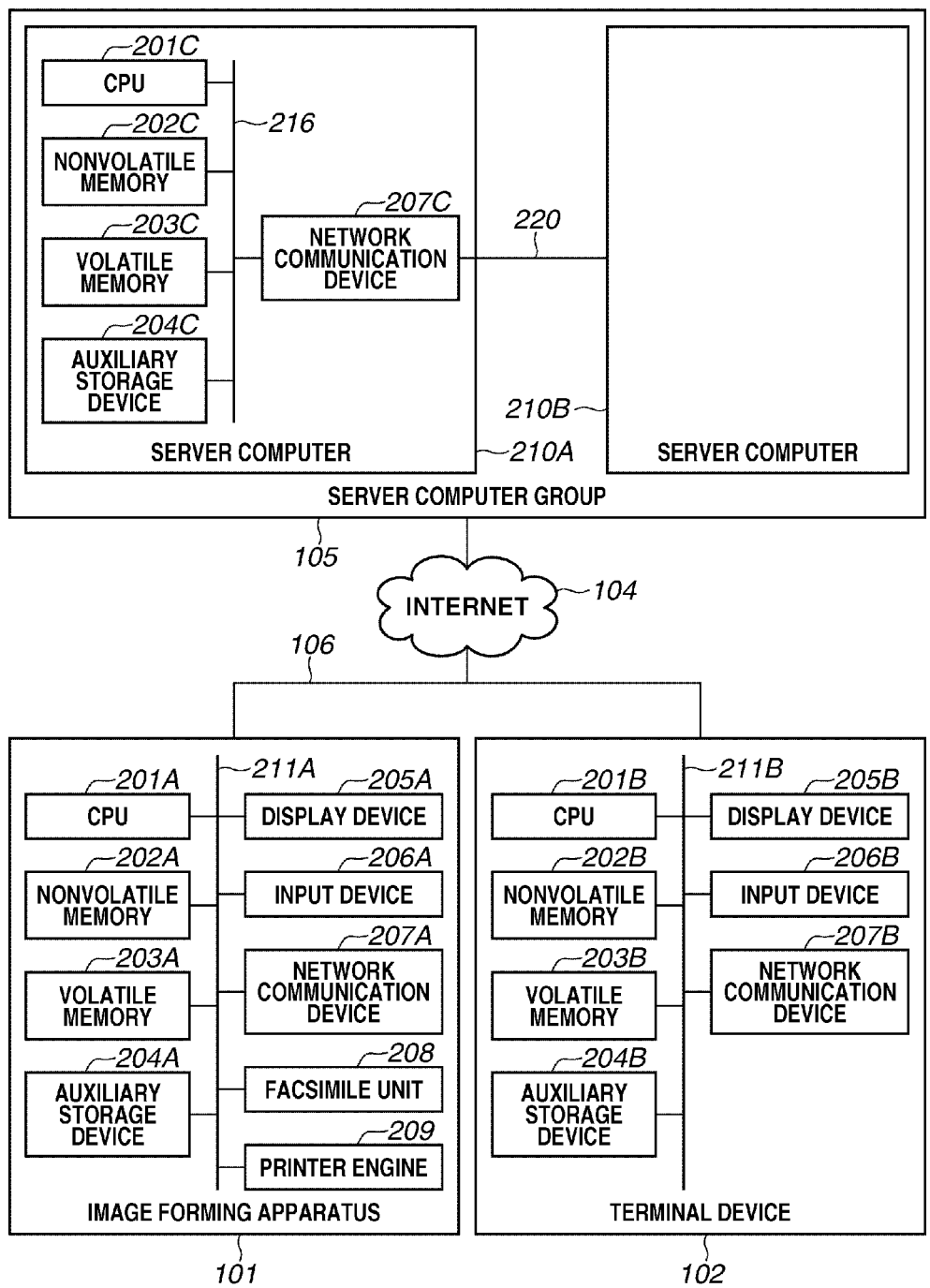

FIG.4

| PRODUCT IDENTIFIER | APPLICATION IDENTIFIER | LICENSE NUMBER |
|---|---|---|
| P001 | A001 | 2354-a44b-135d-4d56 |
| P020 | A004 | ff52-33ab-321d-13f6 |
| P110 | A010 | ee54-a4bb-475d-4ea6 |

FIG.5A

| 402 | 403 | 404 | 405 | 406 |
|---|---|---|---|---|
| MODEL CODE | FIRMWARE VERSION | DEVICE IDENTIFIER | HDD | FAX |
| 0x001 | 20.03 | D001 | HD0021 | FU00333 |

FIG.5B

| 402 | 403 | 404 | 405 | 406 |
|---|---|---|---|---|
| MODEL CODE | FIRMWARE VERSION | DEVICE IDENTIFIER | HDD | FAX |
| 0x001 | 10.03 | D002 | | |

FIG.6

| DEVICE IDENTIFIER | TENANT IDENTIFIER | VIRTUAL DEVICE CONFIGURATION DATA IDENTIFIER | VIRTUAL LICENSE DATA IDENTIFIER |
|---|---|---|---|
| D001 | 100 | VDC001 | VL001 |
| D002 | 100 | VDC002 | VL002 |
| D003 | 100 | VDC003 | VL003 |
| D004 | 100 | VDC004 | VL004 |
| D005 | 100 | VDC005 | VL005 |
| D006 | 100 | VDC006 | VL006 |
| D007 | 100 | VDC007 | VL007 |
| D008 | 100 | VDC008 | VL008 |
| D009 | 100 | VDC009 | VL009 |
| D010 | 100 | VDC010 | VL010 |
| D011 | 200 | VDC011 | VL011 |
| D012 | 200 | VDC012 | VL012 |
| D013 | 200 | VDC013 | VL013 |
| D014 | 200 | VDC014 | VL014 |
| D015 | 200 | VDC015 | VL015 |
| D016 | 200 | VDC016 | VL016 |
| D017 | 200 | VDC017 | VL017 |

FIG.7A

| TENANT IDENTIFIER 702 | PRODUCT IDENTIFIER 703 | PRODUCT NAME 704 | NUMBER OF LICENSES 705 | LICENSE NUMBER 706 | USAGE DEVICE IDENTIFIER LIST 707 |
|---|---|---|---|---|---|
| 100 | P001 | SECURITY KIT | 10 | 2354-a44b-135d-4d56 | D001,D002,D003,D004,D005, D006,D007,D008,D009,D010 |
| 100 | P020 | TRANSMISSION KIT | 10 | ff52-33ab-321d-13f6 | |
| 100 | P110 | BOX KIT | 5 | ee54-a4bb-475d-4ea6 | |

FIG.7B

| PRODUCT IDENTIFIER 802 | PRODUCT NAME 803 | APPLICATION IDENTIFIER 804 | APPLICATION 805 | NUMBER OF LICENSES 806 | NECESSARY HARDWARE 807 | NECESSARY FIRMWARE VERSION 808 |
|---|---|---|---|---|---|---|
| P001 | SECURITY KIT | A001 | | 10 | | |
| P020 | TRANSMISSION KIT | A004 | App004.jar | 10 | HDD | |
| P110 | BOX KIT | A010 | App010.jar | 5 | | FIRM ≥ 20.01 |

FIG.7C

| LICENSE NUMBER 902 | PRODUCT IDENTIFIER 903 | NUMBER OF REMAINING LICENSES 904 | LICENSE ISSUED DEVICE IDENTIFIER LIST 905 |
|---|---|---|---|
| 2354-a44b-135d-4d56 | P001 | 6 | D001,D003,D004,D006 |
| ff52-33ab-321d-13f6 | P020 | 6 | D001,D003,D004,D006 |
| ee54-a4bb-475d-4ea6 | P110 | 2 | D001,D003,D004 |

FIG.8

SELECT IMAGE FORMING APPARATUS TO BE ASSOCIATED WITH THE FOLLOWING PRODUCT, AND PRESS "COMPLETE" BUTTON.

| PRODUCT NAME | NUMBER OF LICENSES |
|---|---|
| SECURITY KIT | 10 |

|  | DEVICE IDENTIFIER |
|---|---|
| ☑ | D001 |
| ☑ | D002 |
| ☑ | D003 |
| ☐ | D004 |
| ☐ | D005 |
| ☐ | D006 |
| ☐ | D007 |
| ☐ | D008 |
| ☐ | D009 |
| ☐ | D010 |

[ COMPLETE ]

INFORMATION PROCESSING SYSTEM, IMAGE FORMING APPARATUS, MANAGEMENT APPARATUS, INFORMATION PROCESSING METHOD, AND COMPUTER PROGRAM FOR AUTOMATICALLY DETERMINING WHETHER AN APPLICATION IS TO BE APPLIED IN RESPONSE TO CHANGE IN CONFIGURATION INFORMATION

BACKGROUND OF THE INVENTION

1. Field of the Invention

The present invention relates to an information processing system, an image forming apparatus, a management apparatus, an information processing method, and a computer program.

2. Description of the Related Art

In addition to standard functions, an application validation function is available for an image forming apparatus to extend an intended function of the image forming apparatus. For example, the application validation function is realized by validating an extensible application originally stored in the image forming apparatus in such a way as to extend a function of the image forming apparatus. Further, in a case where an extensible application is later installed on the image forming apparatus, the application validation function can be realized by validating the extensible application in such a way as to extend a function of the image forming apparatus.

There is an extensible application that does not operate unless a target image forming apparatus satisfies a specific condition. For example, if an application requires a mass-storage data area, a prerequisite condition to be satisfied for the operation is connecting a hard disk to the image forming apparatus. Further, to operate an extensible application, an image forming apparatus may be required to have a firmware whose version is designated to be a predetermined firmware version or a subsequent firmware version.

According to an installation processing method discussed in Japanese Patent Application Laid-Open No. 2004-5419, it is conventionally feasible to determine whether an application is normally operable based on a result of analysis on property information of a read application and system information of an incorporated device, and perform error notification if it is determined that the application is not normally operable.

According to the conventional technique, if an image forming apparatus does not satisfy a prerequisite condition to validate an application, each user is required to perform validation processing again after completing preliminary processing required to satisfy the prerequisite condition. When a user performs validation processing again, the user is required to have special knowledge to check whether the image forming apparatus satisfies the prerequisite condition. In addition, in a case where a user asks a service engineer to perform work for validating an application to be applied to an image forming apparatus, the service engineer may not complete the required work if a hardware device required to validate the application is not prepared at a setup place of the image forming apparatus.

In general, the number of licenses issuable for a function extending application is limited to a predetermined value for each product according to a license management function. Accordingly, if a license is erroneously issued for an image forming apparatus that does not satisfy a prerequisite condition, a valid license may not be issued for another image forming apparatus satisfying the prerequisite condition, without requiring any special work, if the number of issued licenses has already reached the predetermined value.

In addition, in the conventional image forming apparatus management system, there is no information processing system discussed which can automatically determine whether a condition for validating a target application to be applied to an image forming apparatus in the image forming apparatus is satisfied in response to a change in configuration information of the image forming apparatus.

SUMMARY OF THE INVENTION

The present invention relates to a system configured to manage an image forming apparatus. More specifically, the present invention relates to an information processing system that can automatically determine whether a condition for validating a target application to be applied to the image forming apparatus in the image forming apparatus is satisfied in response to a change in configuration information of the image forming apparatus.

According to an aspect of the present invention, an information processing system includes an image forming apparatus and a management apparatus, the management apparatus being configured to manage the image forming apparatus. The image forming apparatus includes a configuration change determination unit configured to determine whether there is any change in configuration information of a device provided in the image forming apparatus, a configuration information transmission unit configured to, if it is determined that there is a change in the configuration information, transmit the changed configuration information to the management apparatus via a network, and a validation unit configured to transmit a license issuance request to the management apparatus to acquire a license, and configured to validate an application to be applied to the image forming apparatus with reference to the acquired license. The management apparatus includes a first registration unit configured to register first correspondence information indicating a correspondence between the image forming apparatus and a product of an application to be applied to the image forming apparatus, a first acquisition unit configured to acquire the configuration information from the image forming apparatus, a second acquisition unit configured to specify a product that corresponds to an image forming apparatus as a transmission source of the configuration information based on the first correspondence information, and to acquire product information relating to the specified product, a condition determination unit configured to determine whether a condition for validating an application that corresponds to a product indicated by the product information in the image forming apparatus is satisfied based on the configuration information acquired by the first acquisition unit and the product information acquired by the second acquisition unit, and a first transmission unit configured to, if the condition determination unit determines that the condition for validating the application in the image forming apparatus is satisfied, transmit information to be used by the image forming apparatus to make the license issuance request to the image forming apparatus.

The information processing system according to the present invention can automatically determine whether a prerequisite condition for validating a target application to be applied to an image forming apparatus in the image forming apparatus is satisfied in response to a change in configuration information of the image forming apparatus. Thus, if the target image forming apparatus satisfies the prerequisite condition, it is feasible to issue a license required to validate the application having been set beforehand for the image forming apparatus. Accordingly, even when a user does not have any special knowledge about an application whose prerequisite condition is complicated, the application can be validated easily.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a hardware configuration of the information processing system according to the exemplary embodiment of the present invention.

FIG. 4 illustrates an example of license data.

FIGS. 5A and 5B illustrate examples of actual device configuration data.

FIG. 6 illustrates an example of virtual devices.

FIGS. 7A to 7C illustrate examples of product management data, product data, and license history data.

FIG. 8 illustrates an example of a product management data association screen.

DESCRIPTION OF THE EMBODIMENTS

Figure 1:
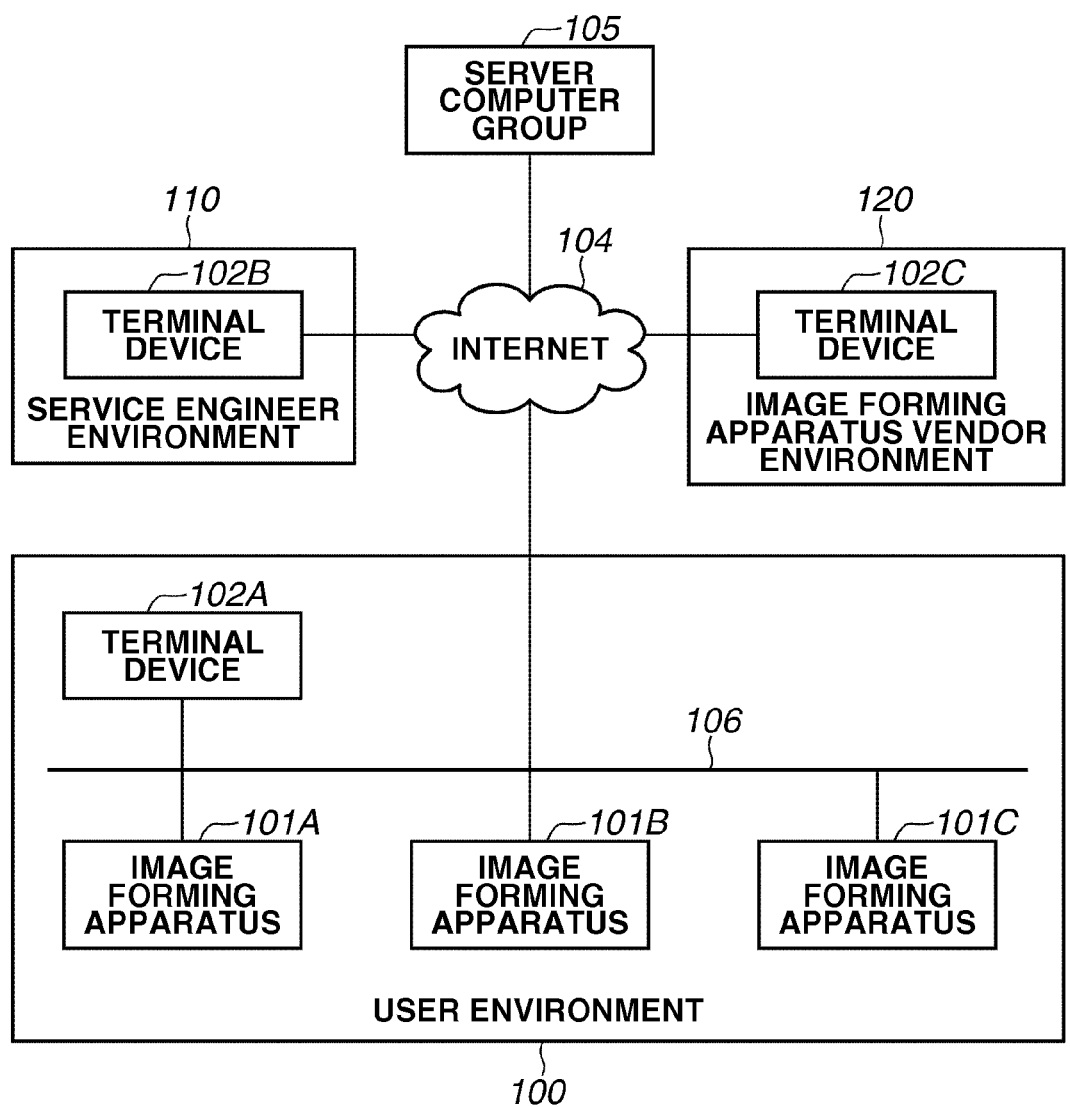
FIG. 1 illustrates an example configuration of an information processing system according to an exemplary embodiment of the present invention.

Various exemplary embodiments, features, and aspects of the invention will be described in detail below with reference to the drawings.

An information processing system according to an exemplary embodiment is described below. First, the present exemplary embodiment includes technical terms defined in the following manner. A license is a file that includes information required to validate an application when the application is applied to an image forming apparatus. More specifically, the license includes an application identifier, a product identifier, a license identifier, a license number, and a device identifier list.

The application identifier has a value that can uniquely identify an application to be validated. The product identifier has a value that can uniquely identify a product of the application to be validated. The product is, for example, a security kit, a transmission kit, or a box kit. The license identifier has a value that can uniquely identify each license. The license number is a number that is used to issue each license. The license number is described in detail below. The device identifier list is a list of device identifiers of image forming apparatuses that can validate the application based on the license. The device identifier has a value that can uniquely identify each image forming apparatus.

The image forming apparatus can perform validation processing for an extensible application originally stored in the own apparatus based on a license acquired from a server computer group (i.e., an external apparatus). Alternatively, the image forming apparatus can acquire both the extensible application and the license from the server computer group and validate the extensible application based on the acquired license.

The license number is a number to be issued when a user has purchased a product. The license number is required to issue a license that corresponds to the purchased product. It is feasible to issue a plurality of licenses that corresponds to the number of licenses determined beforehand for the product identified by the license number. For example, it is assumed that the total number of licenses issuable for a product A is five, and the total number of licenses issuable for a product B is ten. In this case, five licenses are issuable for a license number A of the product A. Ten licenses are issuable for a license number B of the product B.

Further, it is feasible to issue a plurality of license numbers for a single product. Therefore, for example, if three license numbers (e.g., license number B, license number C, and license number D) have been issued when the above-described product B is purchased, ten licenses are issuable for each license number.

License data indicates license information of an application validated in an image forming apparatus. For example, the license data includes identification information, such as a product identifier, an application identifier, and a license number.

Device configuration data indicates a configuration of a device provided in an image forming apparatus. For example, the device configuration data includes data indicating a facsimile unit and a hard disk provided in the image forming apparatus. Further for example, the device configuration data includes a model code that can uniquely identify the model of the image forming apparatus, a device identifier that can uniquely identify the image forming apparatus itself, and version information of a firmware that is operating on the image forming apparatus.

A virtual device is a data group of an actual device, which is stored in a virtual device management service 302 (see FIG. 3B) configured on a server computer group 105 illustrated in FIG. 1. The virtual device management service 302 associates each virtual device with an actual device in a one-to-one relationship. More specifically, the virtual device corresponds to an image forming apparatus that is managed by the virtual device management service 302. The virtual device includes, at least, a device configuration data identifier and a license data identifier.

Tenant is a unit of a consignor who performs management of an image forming apparatus for a user. A tenant identifier is an identifier that uniquely identifies each tenant. For example, it is assumed that a company entrusts a tenant with management of a plurality of image forming apparatuses 101A, 101B, and 101C in a user environment 100 illustrated in FIG. 1, which is described below. In this case, a single tenant identifier is allocated to the user environment 100. Each of the image forming apparatuses 101A, 101B, and 101C is recognized and managed as an image forming apparatus that belongs to the same tenant.

Further, the description includes the following definitions to discriminate data included in a virtual device from data stored in an actual device. The device configuration data included in the virtual device is referred to as "virtual device configuration data." The license data included in the virtual device is referred to as "virtual license data." The device configuration data stored in the actual device is referred to as "actual device configuration data." The license data stored in the actual device is referred to as "actual license data."

FIG. 1 illustrates an example of the entire configuration of the information processing system according to the present exemplary embodiment. The system illustrated in FIG. 1 includes the user environment 100, the server computer group 105, a service engineer environment 110, and an image forming apparatus vendor environment 120. The user environment 100 through the image forming apparatus vendor environment 120 can communicate with each other via an internet 104. The internet 104 is a network that enables various devices to perform digital communications via a public line.

The user environment 100 is an environment in which a user of an image forming apparatus can operate the image forming apparatus. The user environment 100 includes a plurality of image forming apparatuses 101A, 101B, and 101C and a terminal device 102A. Each of the image forming apparatuses 101A, 101B, and 101C is functionally operable as an image forming apparatus according to the present exemplary embodiment. In the following description, each of the image forming apparatuses 101A, 101B, and 101C may also be simply referred to as the image forming apparatus 101. A network 106 is provided in the user environment 100 to perform digital communications. Each of the image forming apparatuses 101A through 101C is accessible to the internet 104 via the network 106. The terminal device 102A is a computer that can be operated by a user in the user environment 100. The terminal device 102A is accessible to the internet 104 via the network 106.

The server computer group 105 is a server group that can provide various services via the internet 104. In the present exemplary embodiment, the server computer group 105 is functionally operable as a management apparatus that can manage applications and licenses to be provided to the respective image forming apparatuses.

The service engineer environment 110 is an environment in which a service engineer can operate a terminal device 102B to manage an image forming apparatus. The service engineer environment 110 includes the terminal device 102B. The terminal device 102B is a computer that can be operated by the service engineer to manage the image forming apparatuses 101A, 101B, and 101C. The terminal device 102B is accessible to the internet 104.

The image forming apparatus vendor environment 120 is an environment in which a management personnel of a vendor that manufactures the image forming apparatus performs maintenance of data required in the management of the image forming apparatus. The image forming apparatus vendor environment 120 includes a terminal device 102C. The terminal device 102C is a computer that can be operated by the management personnel who belongs to the vendor of the image forming apparatus. The terminal device 102C is accessible to the internet 104. In the following description, each of the terminal devices 102A, 102B, and 102C may also be simply referred to as the terminal device 102.

FIG. 2 illustrates an example of a hardware configuration of the information processing system according to the present exemplary embodiment. The server computer group 105 includes a server computer 210A and a server computer 210B. The server computer 210B has a configuration similar to that of the server computer 210A. The server computer 210A and the server computer 210B can communicate with each other via a network 220.

The server computer 210A includes a central processing unit (CPU) 201C connected to a network communication device 207C through an internal bus 216. The image forming apparatus 101 includes a CPU 201A which is connected to a printer engine 209 through an internal bus 211A. The terminal device 102 includes a CPU 201B which is connected to a network communication device 207B through an internal bus 211B.

In the following description, each of the CPUs 201A, 201B and 201C may also be simply referred to as the "CPU 201." Each of nonvolatile memories 202A, 202B, and 202C may also be simply referred to as a "nonvolatile memory 202." Each of volatile memories 203A, 203B, and 203C may also be simply referred to as a "volatile memory 203." Each of auxiliary storage devices 204A, 204B, and 204C may be referred to as an "auxiliary storage device 204." Each of display devices 205A and 205B may be referred to as a "display device 205." Each of input devices 206A and 206B may also be simply referred to as an "input device 206." Each of network communication devices 207A and 207B may also be simply referred to as a "network communication device 207." Each of internal buses 211A and 211B may also be simply referred to as "internal bus 211."

The CPU 201 can execute each program and control various processing. The nonvolatile memory 202 includes a read only memory (ROM). The nonvolatile memory 202 stores programs and data, which are required in the initial stage of device start-up processing. The volatile memory 203 includes a random access memory (RAM). The volatile memory 203 can temporarily store programs and data.

The auxiliary storage device 204 is a mass storage device, such as a hard disk or a RAM drive. The auxiliary storage device 204 can store large-volume data and execution codes of respective programs. Compared to the volatile memory 203, the auxiliary storage device 204 can be preferably used to store data to be stored for a long time. The display device 205 can perform processing for displaying information to notify a user of the information. In the present exemplary embodiment, both of the user and the service engineer may be collectively referred to as a "user."

The input device 206 can receive a selection instruction of the user and transmit the received instruction to a program via the internal bus 211. The network communication device 207 is an apparatus that can communicate with an external apparatus via a network.

A facsimile unit 208 is a hardware unit that can transmit image data formed by the image forming apparatus 101 or image data stored in the auxiliary storage device 204A to an external apparatus via the network 106. The facsimile unit 208 is an optional unit. The facsimile unit 208 may not be provided in the image forming apparatus 101. The printer engine 209 prints image data formed by the image forming apparatus 101 or image data stored in the auxiliary storage device 204A on a paper medium.

Figure 3A:
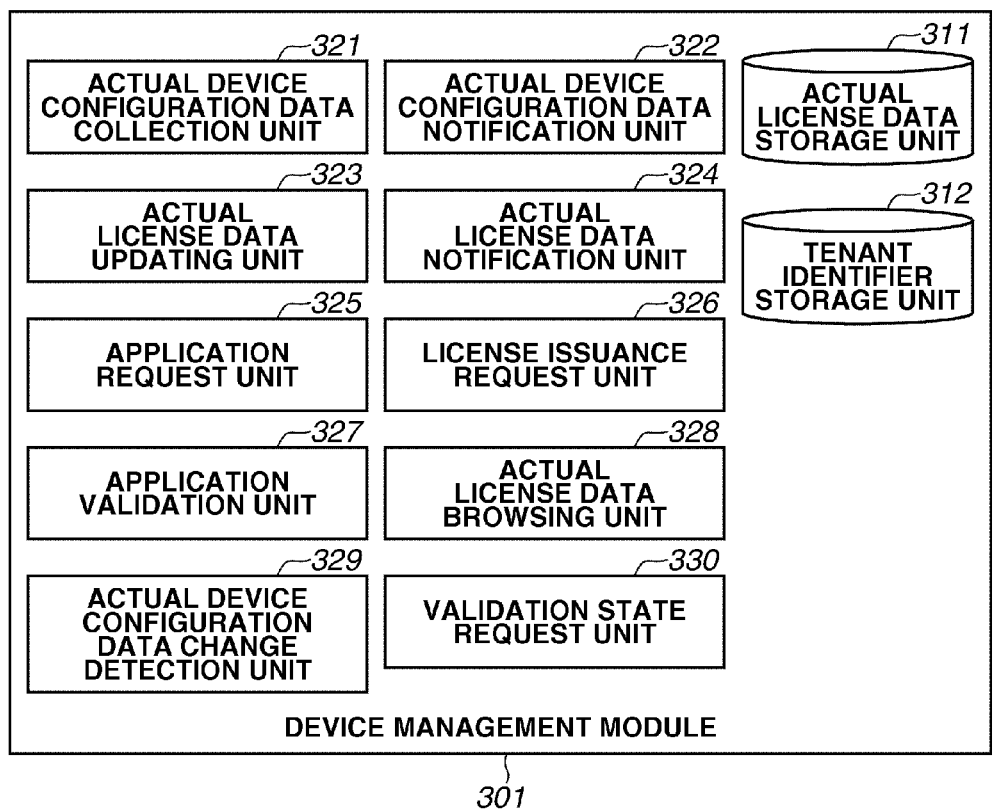
FIGS. 3A to 3C illustrate an example of a functional block diagram of the information processing system according to the exemplary embodiment of the present invention.
Figure 3B:
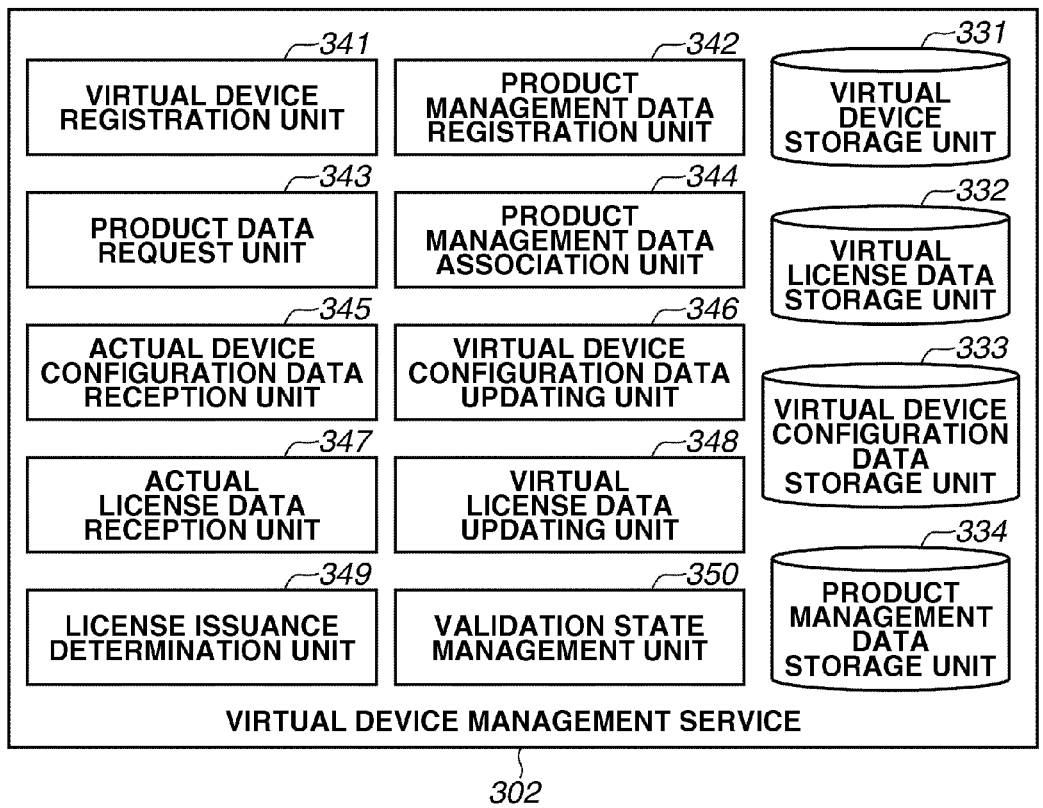
Figure 3C:
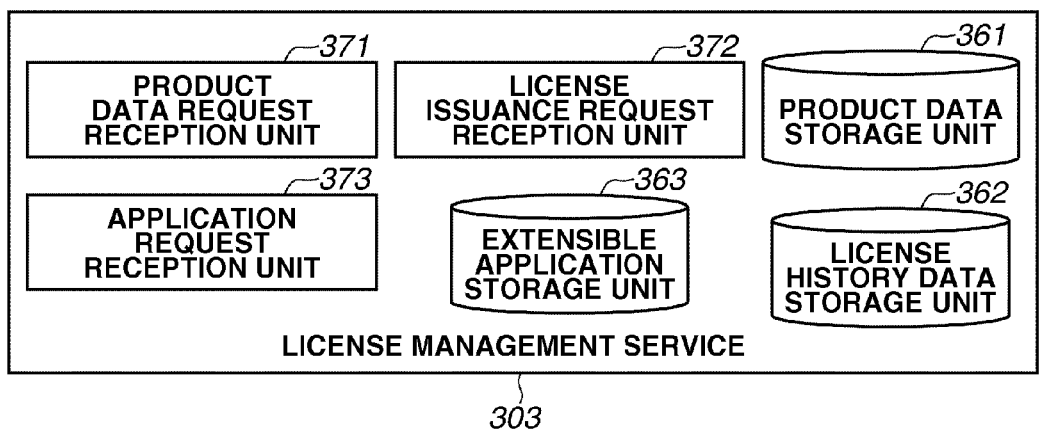

FIGS. 3A to 3C are functional block diagrams that illustrate an example of the information processing system according to the present exemplary embodiment. FIG. 3A illustrates an example configuration of a device management module 301. FIG. 3B illustrates an example configuration of the virtual device management service 302. FIG. 3C illustrates an example configuration of a license management service 303. The virtual device management service 302 and the license management service 303 are functionally operable as a management apparatus that can manage the image forming apparatus 101. The information processing system illustrated in FIGS. 3A to 3C can functionally realize an information processing method and can execute computer programs according to the present exemplary embodiment.

The device management module 301 illustrated in FIG. 3A is provided on the image forming apparatus 101 illustrated in FIG. 1 and can realize functions of the image forming apparatus 101. The device management module 301 includes an actual license data storage unit 311, a tenant identifier storage unit 312, an actual device configuration data collection unit 321, an actual device configuration data notification unit 322, and an actual license data updating unit 323. Further, the device management module 301 includes an actual license data notification unit 324, an application request unit 325, and a license issuance request unit 326. Further, the device management module 301 includes an application validation unit 327, an actual license data browsing unit 328, an actual device configuration data change detection unit 329, and a validation state request unit 330.

The actual license data storage unit 311 can store license data. The license data is data relating to a license required to validate an application to be applied to the image forming apparatus 101. More specifically, the actual license data storage unit 311 can store the license data (i.e., actual license data) in the auxiliary storage device 204A and manage the stored license data. The actual license data storage unit 311 can store the license data in association with a license data identifier. The license data identifier is identification information that can uniquely identify the license data.

FIG. 4 illustrates an example of the license data. The license data includes data items of a product identifier 502, an application identifier 503, and a license number 504. The product identifier 502 is identification information that can uniquely identify each product of an application validated based on the license. The application identifier 503 is identification information that can uniquely identify each application validated based on the license.

The license number 504 is a number that can be used to issue each license. It is understood from the license data illustrated in FIG. 4 that there are three applications that are validated in the image forming apparatus 101. The license data illustrated in FIG. 4 is actual license data. Virtual license data is similar to the actual license data in the data configuration.

Referring back to FIG. 3A, the tenant identifier storage unit 312 can store tenant identifiers. The tenant identifier is identification information that can uniquely identify a tenant to which the image forming apparatus 101 belongs. The tenant identifier can be set in an initial setup operation of the image forming apparatus 101. The tenant identifier is not erased when a power source is turned off because the tenant identifier is stored in the auxiliary storage device 204A.

The actual device configuration data collection unit 321 can collect the device configuration data, i.e., the actual device configuration data, of the image forming apparatus 101.

FIGS. 5A and 5B illustrate examples of the actual device configuration data. The actual device configuration data pieces illustrated in FIGS. 5A and 5B are usable for different image forming apparatuses. The actual device configuration data includes data items of a model code 402, a firmware version 403, a device identifier 404, an HDD 405, and a FAX 406. The model code 402 has a value that can uniquely identify the model of the image forming apparatus 101. The firmware version 403 is version information of a firmware included in the image forming apparatus 101.

The device identifier 404 is an identifier that uniquely identifies the image forming apparatus 101. The HDD 405 is an identification number that uniquely identifies an HDD provided in the image forming apparatus 101. The FAX 406 is an identification number that uniquely identifies a facsimile machine provided in the image forming apparatus 101. No data is set in the data item, which is not included in the image forming apparatus 101. The virtual device configuration data has a data configuration similar to that of the actual device configuration data. Accordingly, the actual device configuration data pieces illustrated in FIGS. 5A and 5B are described appropriately as the virtual device configuration data pieces.

The actual device configuration data notification unit 322 can transmit the actual device configuration data collected by the actual device configuration data collection unit 321, together with the tenant identifier stored in the tenant identifier storage unit 312, to the actual device configuration data reception unit 345 included in the virtual device management service 302.

The actual license data updating unit 323 can update the actual license data stored in the actual license data storage unit 311. The actual license data updating unit 323 updates the actual license data when the application validation unit 327 validates the application. More specifically, the actual license data updating unit 323 acquires a license used by the application validation unit 327 in validating the application, from the application validation unit 327. Then, the actual license data updating unit 323 adds data included in the acquired license (e.g., the product identifier, the application identifier, and the license number) as actual license data.

The actual license data notification unit 324 can notify the virtual device management service 302 via the internet 104 (see FIG. 1) of the actual license data stored in the actual license data storage unit 311. The actual license data notification unit 324 transmits the device identifier and the tenant identifier to an actual license data reception unit 347 of the virtual device management service 302 when the actual license data notification unit 324 notifies the actual license data. The virtual device management service 302 can identify the virtual device with reference to the device identifier and the tenant identifier.

The application request unit 325 can transmit an extensible application acquisition request to an application request reception unit 373 of the license management service 303 (see FIG. 3C) via the internet 104. The extensible application acquisition request is a request for requesting transmission of an extensible application. The extensible application is an application that can extend the function of the image forming apparatus 101.

The application request unit 325 transmits the application identifier indicating the requested extensible application together with the extensible application acquisition request to the license management service 303. The application request unit 325 acquires the extensible application from the application request reception unit 373 that corresponds to the extensible application acquisition request, and transfers the acquired extensible application to the application validation unit 327.

The license issuance request unit 326 can transmit a license issuance request to a license issuance request reception unit 372 of the license management service 303 via the internet 104. The license issuance request is a request for requesting issuance of a license. The license issuance request unit 326 transmits the license number and the device identifier to the license management service 303, in addition to the license issuance request. The license issuance request unit 326 receives the license issued by the license issuance request reception unit 372 in response to the license issuance request, via the internet 104. The license issuance request unit 326 transfers the received license to the application validation unit 327.

The application validation unit 327 acquires the license from the license issuance request unit 326 and validates the extensible application based on the acquired license. The application validation unit 327 determines whether the device identifier of the image forming apparatus 101 is present in the device identifier list included in the license. If it is determined that the device identifier of the image forming apparatus 101 is present in the device identifier list, the application validation unit 327 validates the extensible application. More specifically, the license issuance request unit 326 and the application validation unit 327 are functionally operable as a validation unit configured to perform the following processing. The validation unit sends a license issuance request to the license management service 303 to acquire a license, and validates an application to be applied to the image forming apparatus 101 based on the acquired license.

For example, the application validation unit 327 has a function of validating the extensible application that is already installed on the image forming apparatus 101. The above-described function to be performed by the application validation unit 327 is referred to as an "internal application validation function." The internal application validation function is capable of validating an extensible application that coincides with the application identifier included in the license, in a plurality of extensible applications already installed in the image forming apparatus 101.

Further, the application validation unit 327 has a function of validating the extensible application acquired from the application request unit 325, namely a newly installed extensible application. The above-described function to be performed by the application validation unit 327 is referred to as an "external application validation function." The external application validation function is capable of validating an extensible application that coincides with the application identifier included in the license, in newly installed extensible applications. The application validation unit 327 notifies the actual license data updating unit 323 of the validation of the application and updates the actual license data.

The actual license data browsing unit 328 can provide a user interface (UI) that enables users to browse the actual license data. The actual license data browsing unit 328 displays an actual license data browsing screen on the display device 205A according to a browsing instruction from the input device 206A of the image forming apparatus 101. If the network communication device 207A (see FIG. 2) receives a browsing request from the terminal device 102A provided in the user environment 100, the actual license data browsing unit 328 can be configured to return a response including an actual license data browsing screen to respond to the browsing request. The actual device configuration data change detection unit 329 can detect a change in the actual device configuration data of the image forming apparatus 101.

The validation state request unit 330 can transmit a validation state acquisition request to a validation state management unit 350 of the virtual device management service 302. The validation state acquisition request is a request for requesting transmission of information indicating an application validation state in the target image forming apparatus 101. The validation state request unit 330 receives the information indicating the application validation state in the target image forming apparatus 101 as a response to the validation state acquisition request from the validation state management unit 350. The validation state request unit 330 displays the received information.

The virtual device management service 302 illustrated in FIG. 3B includes a virtual device storage unit 331, a virtual license data storage unit 332, a virtual device configuration data storage unit 333, and a product management data storage unit 334. Further, the virtual device management service 302 includes a virtual device registration unit 341, a product management data registration unit 342, a product data request unit 343, a product management data association unit 344, an actual device configuration data reception unit 345, and a virtual device configuration data updating unit 346. Further, the virtual device management service 302 includes the actual license data reception unit 347, a virtual license data updating unit 348, a license issuance determination unit 349, and the validation state management unit 350.

The virtual device storage unit 331 can store virtual devices. The virtual device storage unit 331 stores (registers) each virtual device in the auxiliary storage device 204C and manages each stored (registered) virtual device.

FIG. 6 illustrates an example of the virtual devices. The virtual device includes a device identifier 602, a tenant identifier 603, a virtual device configuration data identifier 604, and a virtual license data identifier 605. The device identifier 602 is identification information that can uniquely identify the virtual device. The tenant identifier 603 is identification information that can uniquely identify a tenant that corresponds to the virtual device. The virtual device configuration data identifier 604 is identification information that can uniquely identify the virtual device configuration data. The virtual license data identifier 605 is identification information that can uniquely identify the virtual license data.

Referring back to FIG. 3B, the virtual license data storage unit 332 can store the virtual license data. The virtual license data storage unit 332 associates the license data (see FIG. 4) with the virtual license data identifier that can uniquely identify the license data. The virtual license data storage unit 332 stores (registers) the associated data in the auxiliary storage device 204C and manages the stored (registered) data.

The virtual device configuration data storage unit 333 can store the virtual device configuration data. The virtual device configuration data storage unit 333 associates the device configuration data (see FIGS. 5A and 5B) with the virtual device configuration data identifier that can uniquely identify the device configuration data. The virtual device configuration data storage unit 333 stores the associated data in the auxiliary storage device 204C and manages the stored data.

The product management data storage unit 334 can store product management data. The product management data is information about a product that has been purchased by a user.

FIGS. 7A to 7C illustrate examples of the product management data, product data, and license history data. FIG. 7A illustrates an example of the product management data. The product management data includes data items of a tenant identifier 702, a product identifier 703, a product name 704, the number of licenses 705, a license number 706, and a usage device identifier list 707. The tenant identifier 702 is identification information that can uniquely identify a tenant to which a user who purchases the product belongs. The product identifier 703 is identification information that can uniquely identify the product that the user purchases.

The product name 704 is the name of the product that the user purchases. The number of licenses 705 is information indicating the total number of licenses, which is determined beforehand for the product that the user purchases. The license number 706 is a number required to issue the license to each purchased product. The license number is issued when the user purchases the product. The usage device identifier list 707 is a device identifier list of image forming apparatuses that use the product.

The first record (i.e., data in the first row) of the product management data illustrated in FIG. 7A includes the following information. More specifically, the first record indicates that a user having a tenant identifier "100" has purchased a product to which a total of "10" licenses can be issued and image forming apparatuses having device identifiers "D001" through "D010" are set as the image forming apparatus using the product. The second record indicates that the user having the same tenant identifier "100" has purchased a product to which a total of "10" licenses can be issued and no image forming apparatus is set yet as the image forming apparatus using the product.

Referring back to FIG. 3B, the virtual device registration unit 341 can register the virtual devices. If the network communication device 207C receives a virtual device registration request from an external apparatus, the virtual device registration unit 341 performs virtual device registration processing. The virtual device registration request includes the device identifier and the tenant identifier of the image forming apparatus. The virtual device registration unit 341 generates a record having the received device identifier and the tenant identifier, and registers the generated record as a new virtual device record in the virtual device storage unit 331.

The product management data registration unit 342 can register product management data that corresponds to an application product purchased by a user. If the network communication device 207C receives a product management data registration request from an external apparatus, the product management data registration unit 342 performs product management data registration processing. The product management data registration request includes the tenant identifier and the license number.

The product management data registration unit 342 requests the product data request unit 343 to acquire product data with an argument of the received license number. The product data request unit 343 acquires the product data from a product data request reception unit 371 of the license management service 303 and transfers the acquired product data to the product management data registration unit 342. The product data includes a product identifier, a product name, and the number of licenses. The product management data registration unit 342 generates a record including the acquired tenant identifier, the license number, the product identifier, the product name, and the number of licenses. Then, the product management data registration unit 342 registers the generated record, as a record of new product management data, to the product management data storage unit 334.

The product data request unit 343 can transmit a product data request to the product data request reception unit 371 of the license management service 303. The product data request includes a license number or a product identifier. The product data request reception unit 371 of the license management service 303 acquires product data from a product data storage unit 361 based on the license number or the product identifier included in the received product data request. The product data request reception unit 371 returns a response including the acquired product data to the product data request unit 343.

The product management data association unit 344 determines a virtual device that uses a product purchased by a user. Therefore, the product management data association unit 344 associates a product managed in the product management data with the virtual device that uses the product.

For example, the product management data association unit 344 receives a product management data association request from the terminal device 102 via the internet 104, and returns a response including a product management data association screen illustrated in FIG. 8. The product management data association screen is a user interface (UI) that associates each product with a virtual device that uses the product.

FIG. 8 illustrates an example of the product management data association screen. The above-described product management data association request includes a tenant identifier and a license number. The product management data association unit 344 acquires product management data that coincides with the received license number from the product management data storage unit 334. Then, the product management data association unit 344 sets a product name included in the acquired product management data in the field of a product name 1202 on a product management data association screen 1201. Further, the product management data association unit 344 sets the number of licenses included in the acquired product management data in the field of a number of licenses 1203 on the product management data association screen 1201.

Further, the product management data association unit 344 acquires a device identifier list of the virtual device that coincides with a tenant identifier included in the product management data association request from the virtual device storage unit 331. Then, as illustrated in FIG. 8, the product management data association unit 344 sets the acquired device identifier list in the field of a device identifier 1204 on the product management data association screen 1201.

The terminal device 102 displays the product management data association screen returned from the product management data association unit 344 on the display device 205B. The user can determine an image forming apparatus to be associated with a product displayed on the product management data association screen. The user operates the input device 206B to check a checkbox 1205 of the device identifier 1204 that corresponds to the image forming apparatus to be associated and clicks a complete button 1206. Then, the terminal device 102 performs the following processing. The terminal device 102 transmits a device identifier list that corresponds to the checked checkbox 1205 to the product management data association unit 344.

The product management data association unit 344 stores the received device identifier list in the usage device identifier list 707 of the product management data. Accordingly, each product can be associated with an image forming apparatus that uses the product. More specifically, the product management data association unit 344 is functionally operable as a first registration unit configured to register product management data (first correspondence information), namely information indicating a correspondence between an image forming apparatus and an application product to be applied to the image forming apparatus.

The actual device configuration data reception unit 345 can receive actual device configuration data from the actual device configuration data notification unit 322 included in the device management module 301 (see FIG. 3A). Example processing to be executed after the actual device configuration data reception unit 345 has received the actual device configuration data is described below with reference to a flowchart illustrated in FIG. 10.

The virtual device configuration data updating unit 346 can register the actual device configuration data received by the actual device configuration data reception unit 345 as the virtual device configuration data of a corresponding virtual device. More specifically, the virtual device configuration data updating unit 346 acquires a virtual device record that coincides with the device identifier included in the actual device configuration data received by the actual device configuration data reception unit 345 from the virtual device storage unit 331. The virtual device configuration data updating unit 346 acquires a record that coincides with a virtual device configuration data identifier included in the acquired virtual device record from the virtual device configuration data storage unit 333. Then, the virtual device configuration data updating unit 346 updates the virtual device configuration data of the acquired record based on the actual device configuration data.

The actual license data reception unit 347 can receive a notification from the actual license data notification unit 324 of the device management module 301 via the internet 104. More specifically, the actual license data reception unit 347 receives actual license data from the actual license data notification unit 324.

The virtual license data updating unit 348 can register the actual license data received by the actual license data reception unit 347 as the virtual license data of the corresponding virtual device. More specifically, the virtual license data updating unit 348 acquires a record of the virtual device data that coincides with the device identifier received by the actual license data reception unit 347 from the virtual device storage unit 331. The virtual license data updating unit 348 acquires a record that coincides with a virtual license data identifier included in the acquired record of the virtual device data from the virtual license data storage unit 332. Then, the virtual license data updating unit 348 updates the virtual license data of the acquired record based on the actual license data received by the actual license data reception unit 347.

The license issuance determination unit 349 can determine whether the target image forming apparatus satisfies a prerequisite condition, i.e., a condition required to validate the application. The condition required to validate the application is, for example, an installation condition, i.e., a condition required to install the application on the target image forming apparatus. As described below, the license issuance determination unit 349 acquires product data of a product that corresponds to the target image forming apparatus from the license management service 303. Then, for example, if an HDD is set in a necessary hardware 807 of the product data (see FIG. 7B), the license issuance determination unit 349 determines whether any data is set in the HDD 406 (see FIGS. 5A and 5B) of the device configuration data.

If any data is set in the HDD 406 of the device configuration data, the license issuance determination unit 349 determines that the target image forming apparatus satisfies the condition required to validate the application and permits issuing a license.

Further, for example, the license issuance determination unit 349 determines whether the version number set in the firmware version 403 of the device configuration data (see FIGS. 5A and 5B) is greater than the version number set in a necessary firmware version 808 of the product data. If it is determined that the version number set in the firmware version 403 is greater than the version number set in the necessary firmware version 808 of the product data, the license issuance determination unit 349 performs the following processing. The license issuance determination unit 349 determines that the target image forming apparatus satisfies the condition required to validate the application and permits issuing a license.

More specifically, the license issuance determination unit 349 acquires information relating to hardware/firmware included in the device configuration data. Further, the license issuance determination unit 349 acquires a condition relating to hardware/firmware required to validate the application that corresponds to the product indicated by the product data, included in the product data, in the image forming apparatus. Then, the license issuance determination unit 349 determines whether the information relating to hardware/firmware satisfies the condition relating to hardware/firmware. If the information relating to hardware/firmware satisfies the condition relating to hardware/firmware, the license issuance determination unit 349 determines that the condition for validating the application in the image forming apparatus is satisfied.

If the information relating to hardware/firmware does not satisfy the condition relating to hardware/firmware, the license issuance determination unit 349 determines that the condition for validating the application in the image forming apparatus is not satisfied.

The validation state management unit 350 manages validation state information indicating the application validation state in the image forming apparatus 101. The validation state management unit 350 receives the validation state acquisition request from the validation state request unit 330 in the device management module 301. The validation state management unit 350 determines information indicating the application validation state in the target image forming apparatus 101 in response to the validation state acquisition request. Then, the validation state management unit 350 returns the information indicating the application validation state to the target image forming apparatus 101, i.e., the validation state request unit 330 of the device management module 301.

Next, an example configuration of the license management service 303 illustrated in FIG. 3C is described below. The license management service 303 is functionally operable as a management apparatus that can manage the license. The license management service 303 can be provided by the server computer group 105.

The license management service 303 includes the product data storage unit 361, a license history data storage unit 362, an extensible application storage unit 363, the product data request reception unit 371, the license issuance request reception unit 372, and the application request reception unit 373.

The product data storage unit 361 can store product data. More specifically, the product data storage unit 361 stores the product data in the auxiliary storage device 204C and manages the stored product data.

FIG. 7B illustrates an example of the product data. The product data includes data items of a product identifier 802, a product name 803, an application identifier 804, an application 805, the number of licenses 806, the necessary hardware 807, and the necessary firmware version 808. The product identifier 802 is identification information that can uniquely identify each product. The product name 803 is the name of the product. The application identifier 804 is identification information that can uniquely identify an application that corresponds to the product (e.g., an extensible application).

The application 805 is the name of the application. The number of licenses 806 is the number of licenses that corresponds to the product. The necessary hardware 807 and the necessary firmware version 808 are conditions required to validate the application. The necessary hardware 807 indicates the hardware required to be included in the image forming apparatus 101 to validate the application in the image forming apparatus 101. The necessary firmware version 808 indicates a condition relating to the version of the firmware included in the image forming apparatus 101, which is required to validate the application in the image forming apparatus 101.

Referring back to FIG. 3C, the license history data storage unit 362 can store license history data of a product purchased by each user.

FIG. 7C illustrates an example of the license history data. The license history data includes data items of a license number 902, a product identifier 903, the number of remaining licenses 904, and a license issued device identifier list 905. The license number 902 and the product identifier 903 are similar to the license number 706 and the product identifier 703 of the product management data illustrated in FIG. 7A. The number of remaining licenses 904 is the number of the remaining licenses that are issuable for a product that has the product identifier. The license issued device identifier list 905 is a list of device identifiers of the image forming apparatuses 101 to which the licenses have been issued.

Referring back to FIG. 3C, the extensible application storage unit 363 can store extensible applications. The product data request reception unit 371 can receive a product data request from the product data request unit 343 of the virtual device management service 302.

The product data request reception unit 371 returns a response including the product data of a product that can be specified based on the license number included in the received product data request. More specifically, the product data request reception unit 371 specifies a product identifier that corresponds to the license number included in the product data request with reference to the license history data illustrated in FIG. 7C. The product data request reception unit 371 acquires the product data that corresponds to the above-described specified product identifier from the product data illustrated in FIG. 7B and transmits the acquired product data to the product data request unit 343.

The license issuance request reception unit 372 can receive a license issuance request from the license issuance request unit 326 of the device management module 301 operating on the image forming apparatus 101 via the internet 104 and returns a response including a license issued to the corresponding product. In other words, the license issuance request reception unit 372 is functionally operable as a request reception unit that can receive a license issuance request from the image forming apparatus 101. More specifically, the license issuance request reception unit 372 acquires a license number and a device identifier included in the received license issuance request. The license issuance request reception unit 372 acquires a record of the license history data that corresponds to the acquired license number, from the license history data stored in the license history data storage unit 362.

The license issuance request reception unit 372 determines whether the number of the remaining licenses included in the record of the acquired license history data is not zero (0). If it is determined that the number of the remaining licenses included in the record of the license history data is not zero, the license issuance request reception unit 372 issues a license for the above-described acquired device identifier. Then, the license issuance request reception unit 372 subtracts 1 from the number of the remaining licenses included in the record of the license history data. The license issuance request reception unit 372 adds the device identifier acquired from the license issuance request to the license issued device identifier list of the record. Then, the license issuance request reception unit 372 updates the license history data based on the device identifier added record.

More specifically, the license issuance request reception unit 372 is functionally operable as a second transmission unit configured to determine whether the number of the remaining licenses that corresponds to the license issuance request is not 0 and transmit the license to the image forming apparatus 101 if it is determined that the number of the remaining licenses is not 0.

The application request reception unit 373 can receive an application request from the application request unit 325 of the device management module 301 via the internet 104, and returns a response including a corresponding extensible application. More specifically, the application request reception unit 373 acquires the application identifier included in the application request. The application request reception unit 373 acquires the product data that corresponds to the acquired application identifier from the product data stored in the product data storage unit 361. Then, the application request reception unit 373 returns a response including the extensible application indicated by the acquired product data to the application request unit 325.

Figure 9:
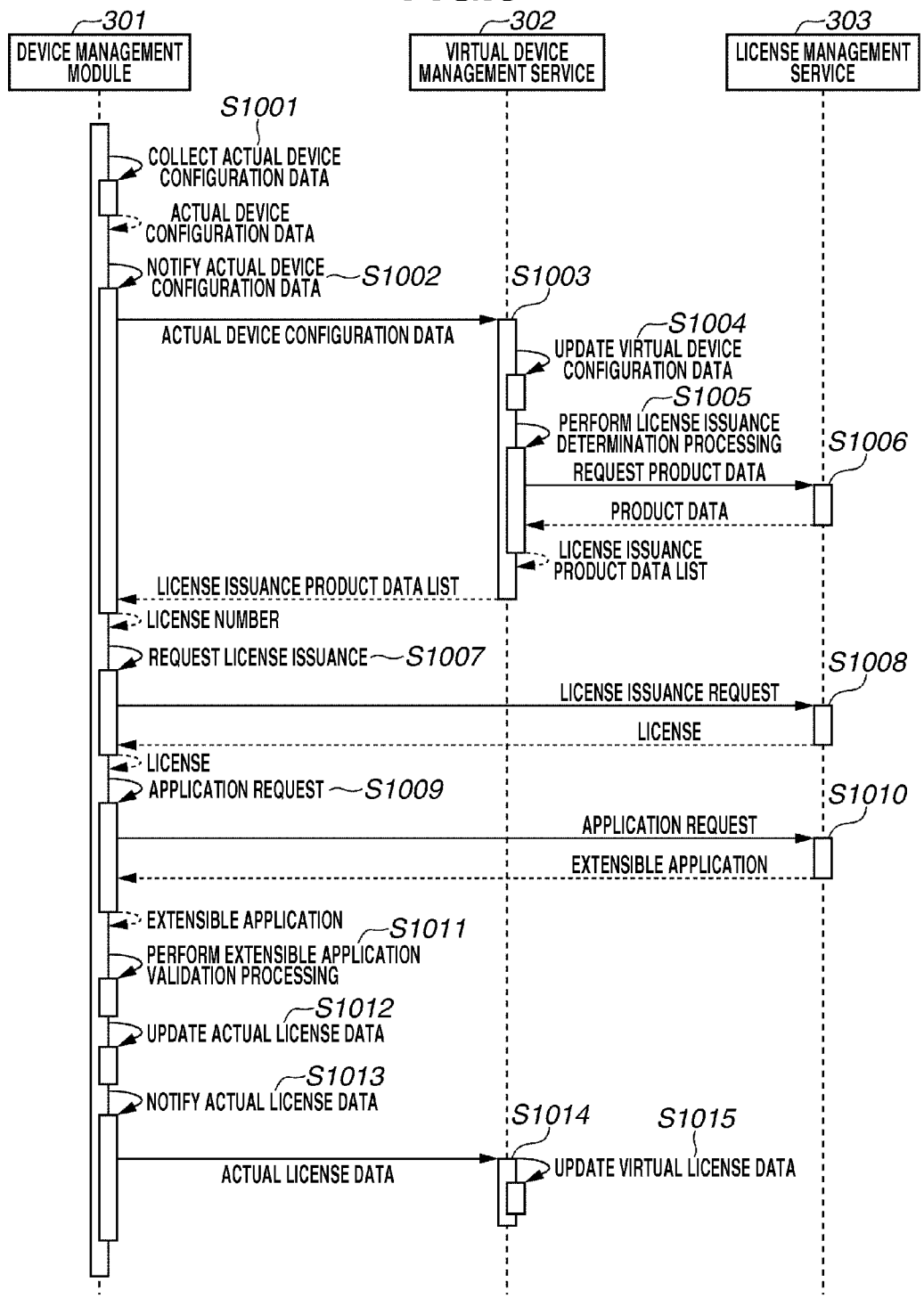
FIG. 9 is a sequence diagram illustrating an example operation that can be performed by the information processing system according to a first exemplary embodiment of the present invention.

FIG. 9 is a sequence diagram illustrating an example operation that can be performed by the information processing system according to the first exemplary embodiment. The operation illustrated in the sequence diagram is automatically started when the actual device configuration data change detection unit 329 detects any change in the actual device configuration data due to connection of a hardware device to the image forming apparatus 101. Alternatively, the operation illustrated in FIG. 9 can be executed in response to an instruction input by a user of the image forming apparatus 101 via the input device 206A. The program for executing the above-described operation can be stored in any one of the nonvolatile memory 202, the volatile memory 203, and the auxiliary storage device 204, and can be executed by the CPU 201.

First, in step S1001, the actual device configuration data collection unit 321 of the device management module 301 collects the actual device configuration data.

Subsequently, the actual device configuration data notification unit 322 functionally operates as a configuration change determination unit configured to determine whether there is any change in the actual device configuration data based on the collected actual device configuration data. If it is determined that the actual device configuration data has changed, then in step S1002, the actual device configuration data notification unit 322 functionally operates as a configuration information transmission unit configured to transmit the changed actual device configuration data to the virtual device management service 302 via the internet 104.

Next, the virtual device management service 302 performs the following processing. First, in step S1003, the actual device configuration data reception unit 345 of the virtual device management service 302 receives the actual device configuration data transmitted from the image forming apparatus 101 in step S1002. More specifically, the actual device configuration data reception unit 345 is functionally operable as a first acquisition unit configured to acquire the actual device configuration data from the image forming apparatus 101.

Subsequently, in step S1004, the virtual device configuration data updating unit 346 updates the virtual device configuration data stored in the virtual device configuration data storage unit 333 based on the actual device configuration data received in step S1003.

Next, in step S1005, the license issuance determination unit 349 performs license issuance determination processing. More specifically, the license issuance determination unit 349 determines whether there is any product that is not yet validated in the target image forming apparatus 101. The target image forming apparatus 101 is the image forming apparatus 101 that corresponds to a device identifier included in the actual device configuration data received in step S1003.

If it is determined that the product not yet validated in the image forming apparatus 101 is present, then in step S1006, the product data request unit 343 inquires the license management service 303 about the product data of the product and acquires the product data of the product.

Then, the license issuance determination unit 349 determines a product that can be validated in the target image forming apparatus 101 based on the virtual device configuration data updated in step S1004 and the product data acquired in step S1006. More specifically, the license issuance determination unit 349 determines whether the virtual device configuration data satisfies a condition required to validate an application that corresponds to the product included in the product data. According to the illustrated example, the condition required to validate the application is the installation condition.

If it is determined that the virtual device configuration data satisfies the installation condition, the license issuance determination unit 349 returns the license issuance product data list, i.e., a product data list indicating products that can be validated, as a response to the device management module 301. The license issuance product data list includes the license number and the device identifier. The device identifier is included in the actual device configuration data. Further, the license number is information to be used when the device management module 301, namely the image forming apparatus 101 requests issuance of a license. Accordingly, the license issuance determination unit 349 is functionally operable as a first transmission unit configured to transmit the information to be used when the image forming apparatus 101 requests issuance of a license to the image forming apparatus 101.

Then, a predetermined processing unit (e.g., the license issuance request unit 326) of the device management module 301 is functionally operable as a reception unit configured to receive the license issuance product data list received from the license issuance determination unit 349. In step S1007, the license issuance request unit 326 transmits a license issuance request, which includes the license number included in the license issuance product data list and the device identifier included in the actual device configuration data, to the license management service 303.

More specifically, the license issuance request unit 326 of the device management module 301 that has received the response from the virtual device management service 302 requests the license management service 303 to issue a license that includes the license number included in the license issuance product data list.

Next, in step S1008, the license issuance request reception unit 372 of the license management service 303 receives the license issuance request transmitted from the device management module 301 in step S1007.

The license issuance request reception unit 372 acquires, from the license history data, a record that coincides with the license number acquired from the received license issuance request. If it is determined that the number of remaining licenses of the acquired record is not 0, the license issuance request reception unit 372 issues a license dedicated to the device identifier acquired from the received license issuance request. The license issuance request reception unit 372 decrements the number of remaining licenses of the acquired record by one, and adds the device identifier acquired from the license issuance request to the license issued device identifier list. Then, the license issuance request reception unit 372 returns a response including the issued license to the device management module 301.

Next, the application request unit 325 of the device management module 301 determines whether an extensible application is present in the license issuance product data list received from the virtual device management service 302. If it is determined that the extensible application is present in the license issuance product data list, then in step S1009, the application request unit 325 transmits an application request for requesting transmission of the extensible application to the license management service 303.

Next, in step S1010, the application request reception unit 373 of the license management service 303 receives the application request from the device management module 301. Subsequently, the application request reception unit 373 acquires the extensible application that corresponds to the received application request from the extensible application storage unit 363 and returns a response including the acquired extensible application to the device management module 301.

Next, in step S1011, the application validation unit 327 of the device management module 301 executes extensible application validation processing based on the license received from the license management service 303 and the extensible application.

Next, in step S1012, the actual license data updating unit 323 generates a record of the actual license data that relates to the license for the application validated in step S1011, and updates the actual license data based on the generated record. In step S1013, the actual license data notification unit 324 notifies the virtual device management service 302 of the actual license data updated in step S1012.

Next, in step S1014, the actual license data reception unit 347 of the virtual device management service 302 receives the actual license data transmitted from the device management module 301. In step S1015, the virtual license data updating unit 348 updates the virtual license data stored in the virtual license data storage unit 332 based on the actual license data received in step S1014.

Figure 10:
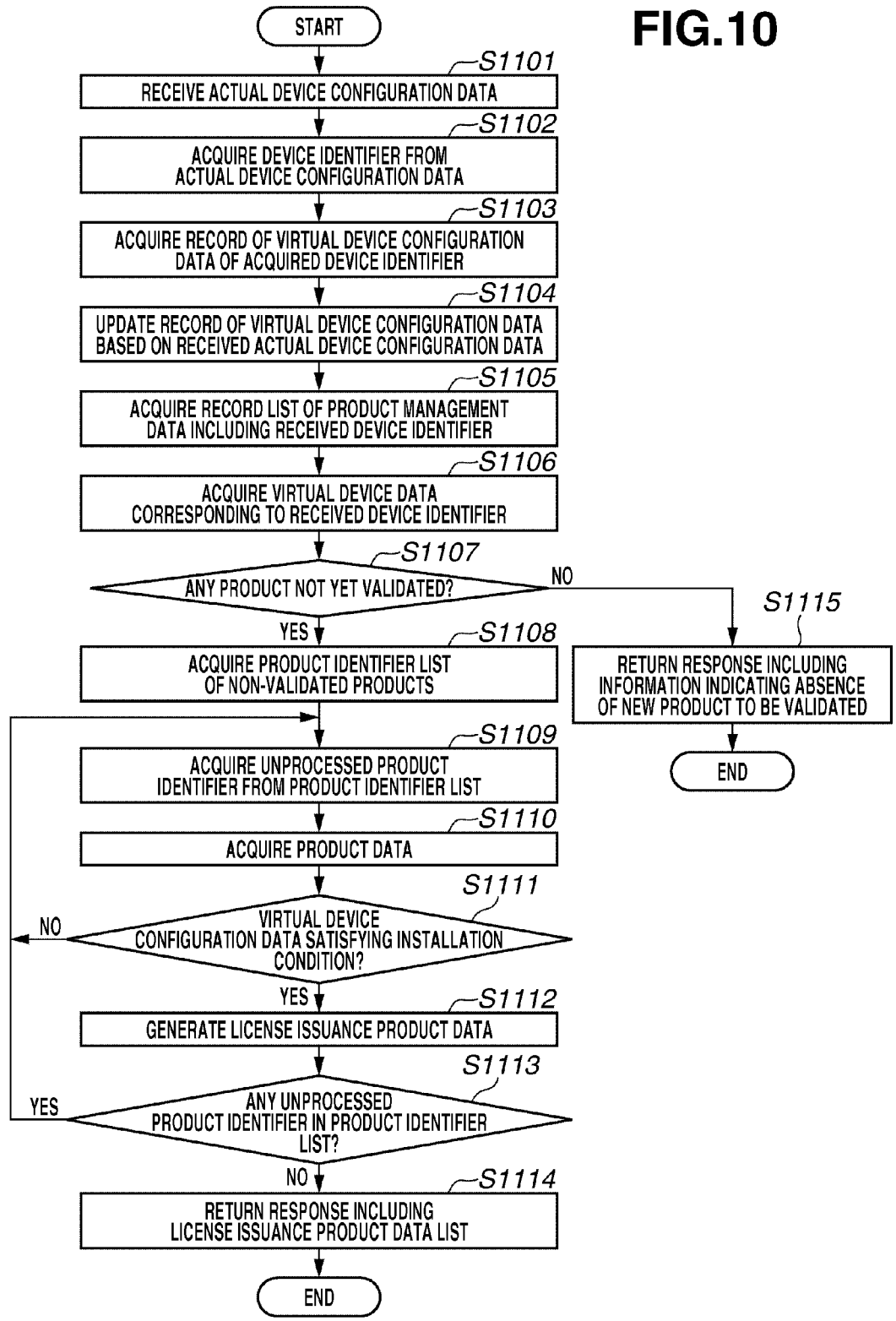
FIG. 10 is a flowchart illustrating an example of license issuance product data list response processing according to the first exemplary embodiment of the present invention.

FIG. 10 is a flowchart illustrating an example of response processing of the license issuance product data list that can be performed by the virtual device management service 302. First, in step S1101, the actual device configuration data reception unit 345 receives the actual device configuration data.

In step S1102, the virtual device configuration data updating unit 346 acquires the device identifier from the received actual device configuration data. In step S1103, the virtual device configuration data updating unit 346 acquires a record of the virtual device configuration data from the virtual device configuration data storage unit 333 using the device identifier acquired in step S1102 as a key.

Next, in step S1104, the virtual device configuration data updating unit 346 updates the content of the record of the virtual device configuration data acquired in step S1103 based on the device configuration data received in step S1101. In step S1105, the license issuance determination unit 349 acquires a record list of the product management data, which includes the device identifier acquired in step S1102 in the usage device identifier list 707, from the product management data storage unit 334.

In step S1106, the license issuance determination unit 349 acquires a record of the virtual device data from the virtual device storage unit 331 with use of the device identifier acquired in step S1102 as a key.

Next, the license issuance determination unit 349 performs the following processing based on the record list of the product management data acquired in step S1105 and the record of the virtual device data acquired in step S1106. More specifically, in step S1107, the license issuance determination unit 349 determines whether there is any product that is not yet validated in the image forming apparatus 101 that corresponds to the device identifier acquired in step S1102.

The processing to be performed in step S1007 is described in detail below. First, the license issuance determination unit 349 acquires the virtual license data (see FIG. 4) that is associated with the virtual license data identifier included in the record of the virtual device data from the virtual license data storage unit 332.

The license issuance determination unit 349 determines whether all of the product identifiers in the record list of the product management data are included in the product identifiers set in the acquired virtual license data. If it is determined that all of the product identifiers in the record list of the product management data are included in the product identifiers set in the virtual license data, the license issuance determination unit 349 determines that the product not yet validated in the image forming apparatus 101 is not present (NO in step S1107). Then, the processing proceeds to step S1115.

In step S1115, the license issuance determination unit 349 returns a response including information indicating the absence of a product to be newly validated to the device management module 301, and terminates the processing illustrated in FIG. 10.

If it is determined that at least one of the product identifiers in the record list of the product management data is not included in the product identifiers set in the virtual license data, the license issuance determination unit 349 determines that there is a product that is not yet validated in the image forming apparatus 101 (YES in step S1107). Then, the processing proceeds to step S1108.

A product that corresponds to a product identifier that is not included in the product identifiers set in the virtual license data, in the product identifiers in the record list of the product management data, is the product not yet validated in the image forming apparatus 101.

In the present exemplary embodiment, the product identifier 502 included in the license data (see FIG. 4) is associated with the device identifier 602 included in the virtual device (see FIG. 6) via the virtual license data identifier. More specifically, the license data and the virtual device data are functionally operable as second correspondence information, i.e., the information indicating a correspondence between the image forming apparatus and a product of the application validated in the image forming apparatus. Accordingly, the virtual device registration unit 341 and the virtual license data updating unit 348 are functionally operable as a second registration unit configured to register the second correspondence information.

From the foregoing, the license issuance determination unit 349 determines the product not yet validated in the image forming apparatus 101 with reference to the virtual license data (see FIG. 4) associated with the virtual license data identifier included in the virtual device record. More specifically, the license issuance determination unit 349 determines the product not yet validated in the image forming apparatus 101 in the products that correspond to the image forming apparatus 101 as a transmission source of the actual device configuration data, with reference to the above-described second correspondence information.

Next, in step S1108, the license issuance determination unit 349 acquires a product identifier list of the products not yet validated in the image forming apparatus 101. Subsequently, in step S1109, the license issuance determination unit 349 acquires an unprocessed product identifier from the acquired product identifier list.

Next, the license issuance determination unit 349 instructs the product data request unit 343 to request acquisition of the product data of the product that corresponds to the product identifier acquired in step S1109. The product data request unit 343 transmits a product data request including the product identifier acquired in step S1109 to the license management service 303 according to the instruction from the license issuance determination unit 349.

The license management service 303 acquires product data that corresponds to the product identifier included in the product data request in response to the product data request and returns the acquired product data to the product data request unit 343. More specifically, the product data request reception unit 371 of the license management service 303 receives the product data request and acquires the product identifier from the product data request. The product data request reception unit 371 acquires the product data that corresponds to the above-described acquired product identifier from the product data (see FIG. 7B) stored in the product data storage unit 361.

In step S1110, the license issuance determination unit 349 acquires the product data returned to the product data request unit 343. More specifically, the license issuance determination unit 349 is functionally operable as a second acquisition unit configured to specify a product that corresponds to the image forming apparatus 101 as the transmission source of the actual device configuration data based on the product management data (see FIG. 7A) and acquire product information relating to the specified product (see step S1108 and step S1110).

Next, in step S1111, the license issuance determination unit 349 determines whether the virtual device configuration data satisfies the installation condition included in the product data. More specifically, the license issuance determination unit 349 is functionally operable as a condition determination unit configured to perform the following processing. The license issuance determination unit 349 determines whether the condition for validating an application that corresponds to the product indicated by the product data in the image forming apparatus 101 is satisfied based on the actual device configuration data received in step S1101 and the product data acquired in step S1110.

If it is determined that the virtual device configuration data satisfies the installation condition (YES in step S1111), then in step S1112, the license issuance determination unit 349 generates license issuance product data, namely the product data of the product that can be validated. Further, in step S1112, the license issuance determination unit 349 acquires a license number that corresponds to the product identifier of the product that can be validated from the record list of the product management data acquired in the above-described step S1105. Then, the license issuance determination unit 349 generates license issuance product data that includes the license number and the device identifier included in the actual device configuration data received in step S1101.

Next, in step S1113, the license issuance determination unit 349 determines whether there is any unprocessed product identifier in the product identifier list of the products not yet validated. If it is determined that at least one unprocessed product identifier is present in the product identifier list of the products not yet validated (YES in step S1113), the processing returns to step S1109. If it is determined that there is not any unprocessed product identifier in the product identifier list of the products not yet validated (NO in step S1113), the processing proceeds to step S1114. In step S1114, the license issuance determination unit 349 returns a response including the license issuance product data list, i.e., a list of the product data of the products that can be validated, and terminates the processing of the flowchart illustrated in FIG. 10.

As described above, the information processing system according to the first exemplary embodiment can transmit a license number for issuing a license that corresponds to an application that needs to be validated in an image forming apparatus to the image forming apparatus by simply notifying the virtual device management service of device configuration data from the image forming apparatus. Then, the image forming apparatus can request the virtual device management service to issue a license including the license number, acquire the license, and validate the application based on the issued license.

In other words, the information processing system according to the first exemplary embodiment can automatically determine whether the prerequisite condition to validate a target application to be applied to an image forming apparatus in the image forming apparatus is satisfied, in response to a change in the configuration information of the image forming apparatus. Therefore, if the target image forming apparatus satisfies the prerequisite condition, it is feasible to issue a license required to validate the application which is set to be used in the image forming apparatus. Accordingly, even when a user does not have any special knowledge about an application whose prerequisite condition is complicated, the application can be validated easily.

Further, the information processing system according to the first exemplary embodiment does not issue any license if it is determined that the device configuration data does not satisfy the prerequisite condition of the application. Therefore, it is feasible to prevent a license from being issued for an image forming apparatus on which the application cannot operate.

Next, an information processing system according to a second exemplary embodiment is described below. The information processing system according to the second exemplary embodiment can display an application to be inherently validated in a target image forming apparatus and work required to validate the application.

Figure 11:
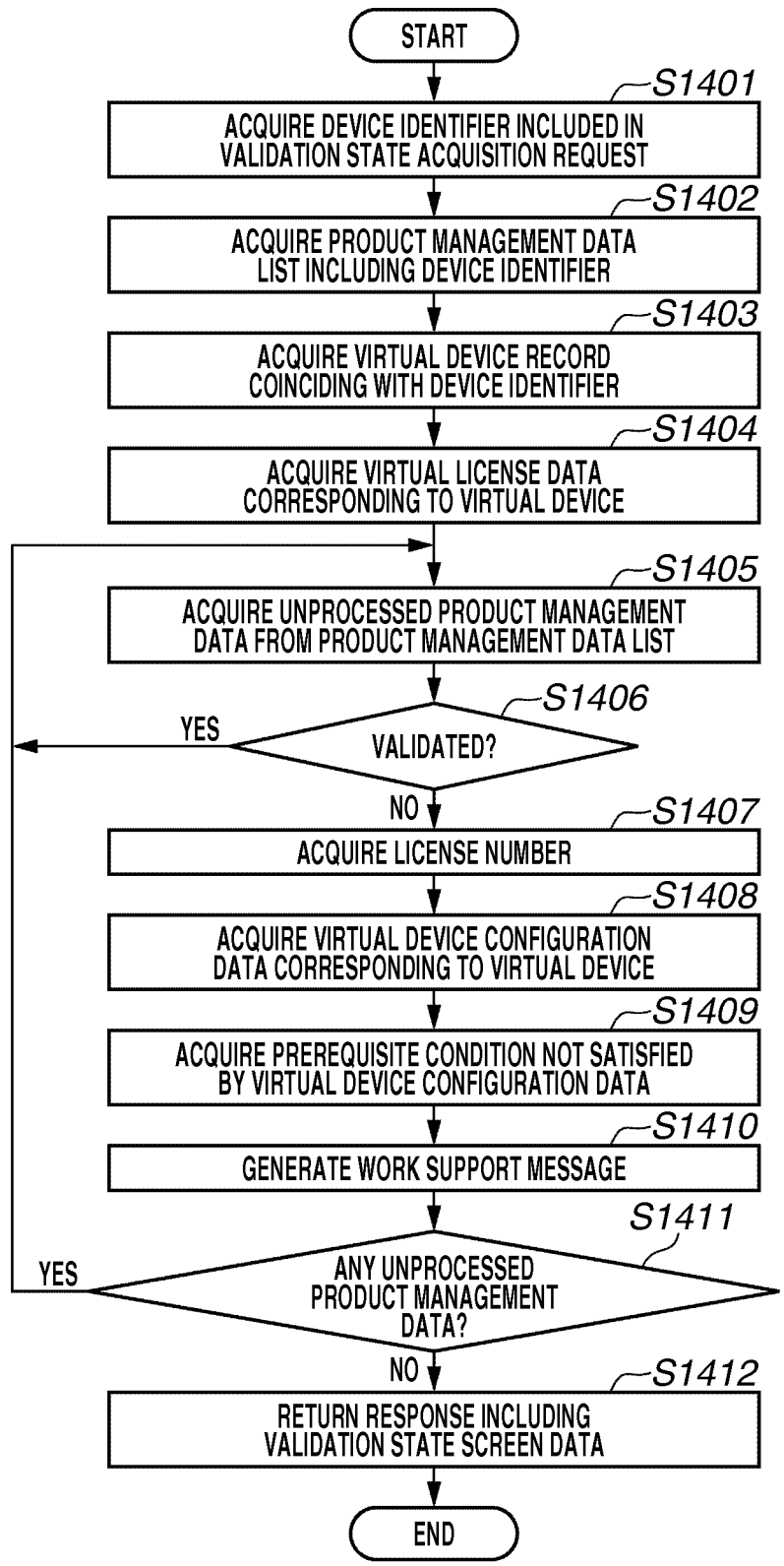
FIG. 11 is a flowchart illustrating an example operation that can be performed by an information processing system according to a second exemplary embodiment of the present invention.

FIG. 11 is a flowchart illustrating an example operation that can be performed by the information processing system according to the second exemplary embodiment. The operation performed by the virtual device management service 302 when receiving a validation state acquisition request from the validation state request unit 330 of the device management module 301 is described with reference to the flowchart illustrated in FIG. 11. The validation state management unit 350 is functionally operable as a validation state request reception unit configured to receive the validation state acquisition request from the validation state request unit 330 of the device management module 301. The validation state acquisition request is a request for requesting transmission of information indicating a validation state of an application in the target image forming apparatus 101. The validation state acquisition request includes the device identifier of the image forming apparatus 101.

In step S1401, the validation state management unit 350 of the virtual device management service 302 acquires the device identifier included in the validation state acquisition request. In step S1402, the validation state management unit 350 acquires a product management data list, that is a list of records including the device identifier acquired in step S1401 in the usage device identifier list 707, from the product management data storage unit 334.

Next, in step S1403, the validation state management unit 350 acquires a virtual device record that coincides with the device identifier acquired in step S1401 from the virtual device storage unit 331. Subsequently, in step S1404, the validation state management unit 350 acquires virtual license data that corresponds to the virtual license data identifier included in the virtual device record acquired in step S1403, from the virtual license data storage unit 332.

In step S1405, the validation state management unit 350 acquires unprocessed product management data from the product management data list acquired in step S1402. In step S1406, the validation state management unit 350 determines whether a product that corresponds to the product management data acquired in step S1405 is already validated in the target image forming apparatus 101. More specifically, the validation state management unit 350 acquires the product identifier from the product management data acquired in step S1405 and determines whether the acquired product identifier is included in the virtual license data acquired in step S1404.

If it is determined that the product identifier acquired from the product management data is included in the virtual license data, the validation state management unit 350 determines that the product corresponding to the product management data is validated in the target image forming apparatus 101 (YES in step S1406). Then, the processing proceeds to step S1405.

If it is determined that the product identifier acquired from the product management data is not included in the virtual license data, the validation state management unit 350 determines that the product corresponding to the product management data is not validated in the target image forming apparatus 101 (NO in step S1406). Then, the processing proceeds to step S1407.

In step S1407, the validation state management unit 350 acquires the license number from the product management data acquired in step S1405. The validation state management unit 350 transfers the acquired license number to the product data request unit 343. Then, the validation state management unit 350 instructs the product data request unit 343 to request the product data.

The product data request unit 343 transmits a product data request to the license management service 303 according to the instruction of the validation state management unit 350. The product data request includes the license number received from the validation state management unit 350. The product data request reception unit 371 of the license management service 303 receives the product data request from the product data request unit 343. The product data request reception unit 371 acquires the product data from the product data storage unit 361 based on the license number included in the product data request. The product data request reception unit 350 transmits the acquired product data to the product data request unit 343, and the product data request unit 343 acquires the product data.

Next, in step S1408, the validation state management unit 350 acquires a virtual device configuration data identifier from the virtual device record acquired in step S1403. The validation state management unit 350 acquires the virtual device configuration data that coincides with the acquired virtual device configuration data identifier from the virtual device configuration data storage unit 333.

Next, in step S1409, the validation state management unit 350 acquires a prerequisite condition not satisfied by the virtual device configuration data acquired in step S1408, from the prerequisite conditions included in the product data acquired in step S1407.

Next, the validation state management unit 350 is functionally operable as a determination unit configured to determine work that satisfies the prerequisite condition acquired in step S1409. In step S1410, the validation state management unit 350 generates a work support message, that is a message indicating the determined work. For example, it is assumed that "HDD" is set in the necessary hardware 807 of the product data and no value is set in the HDD 405 of the virtual device configuration data. In this case, providing the HDD to the image forming apparatus 101 is the work satisfying the prerequisite condition. Therefore, the validation state management unit 350 generates a work support message that includes, for example, a sentence "Please connect a hard disk."

Next, in step S1411, the validation state management unit 350 determines whether there is any unprocessed product management data in the product management data list acquired in step S1402. If it is determined that at least one piece of unprocessed product management data is present (YES in step S1411), the processing returns to step S1405.

If it is determined that there is not any unprocessed product management data (NO in step S1411), the processing proceeds to step S1412. In step S1412, the validation state management unit 350 generates validation state screen data, namely data for forming an application validation state screen, and returns the generated validation state screen data as a response to the validation status request to the validation state request unit 330 of the device management module 301.

The validation state screen data includes the work support message. The validation state request unit 330 receives the validation state screen data from the validation state management unit 350. Then, the validation state request unit 330 displays the application validation state screen based on the received validation state screen data. The validation state request unit 330 displays the work support message on the application validation state screen.

More specifically, in steps S1407 and S1408, the validation state management unit 350 acquires the configuration information that corresponds to the image forming apparatus having requested the validation state acquisition together with the product information of the product not yet validated in the image forming apparatus.

In step S1410, the validation state management unit 350 determines the work required to satisfy the condition for validating the application that corresponds to the product indicated by the acquired product information in the image forming apparatus, based on the configuration information and the product information.

In step S1412, the validation state management unit 350 is functionally operable as a notification unit configured to notify the image forming apparatus of information indicating the application validation state in the image forming apparatus, including information indicating the work.

Figure 12:
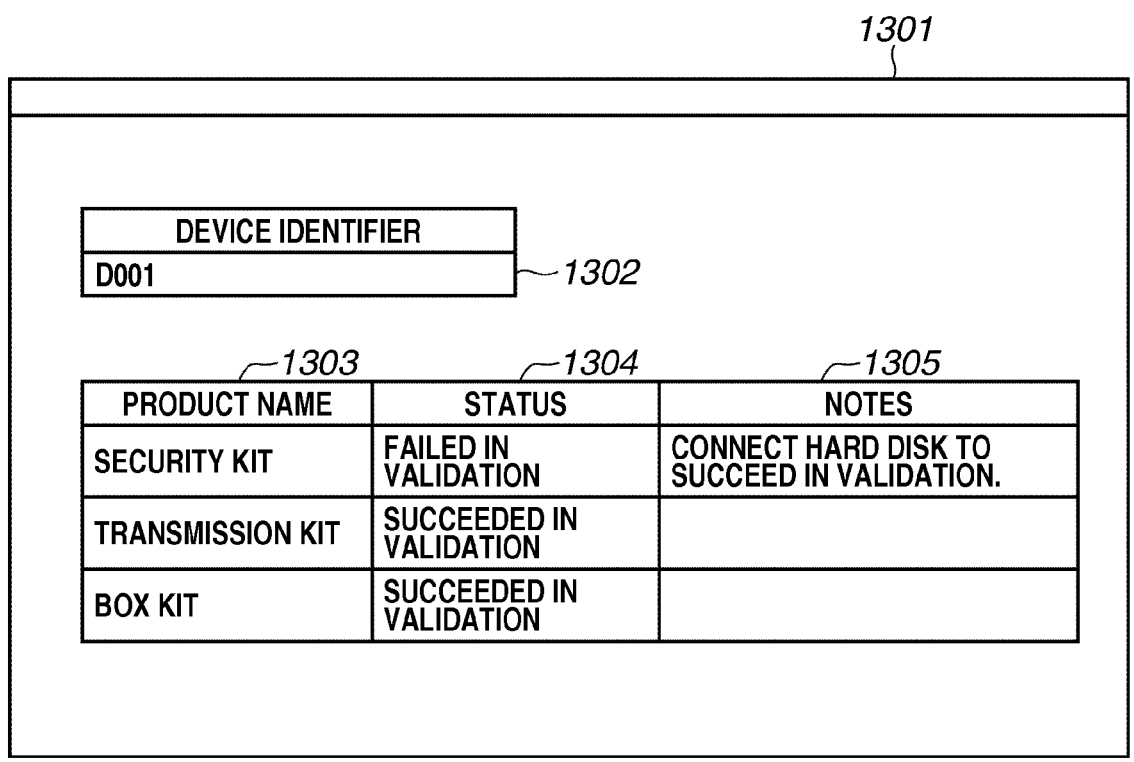
FIG. 12 illustrates an example of an application validation status screen.

FIG. 12 illustrates an example of the application validation status screen. An application validation status screen 1301 illustrated in FIG. 12 includes the field of a device identifier 1302, in which the device identifier acquired in step S1401 illustrated FIG. 11 is displayed. Further, the application validation status screen 1301 includes the field of a product name 1303, in which a product name that corresponds to the product data acquired in step S1407 illustrated FIG. 11 is displayed. Further, the application validation status screen 1301 includes the field of a status 1304, in which a result of the determination processing performed in step S1406 illustrated FIG. 11 is displayed. More specifically, the field of the status 1304 displays the information indicating whether the product that corresponds to the product name is validated in the image forming apparatus 101 that corresponds to the device identifier. Further, the application validation status screen 1301 includes the field of notes 1305, in which the work support message generated in step S1410 illustrated in FIG. 11 is displayed.

According to the information processing system described in the second exemplary embodiment, each user can confirm an application that can be validated in a target image forming apparatus and work to be performed to validate the application.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-147977 filed Jul. 4, 2011, which is hereby incorporated by reference herein in its entirety.

What is claimed is:

1. An information processing system including an image forming apparatus and a management apparatus, the management apparatus being configured to manage the image forming apparatus, wherein the image forming apparatus comprises:
  a configuration change determination unit configured to determine whether there is any change in configuration information of a device provided in the image forming apparatus; and
  a configuration information transmission unit configured to, if it is determined that there is a change in the configuration information, transmit the changed configuration information to the management apparatus via a network;

the management apparatus comprises:
  an acquisition unit configured to acquire the configuration information from the image forming apparatus;
  a storage unit configured to store configuration information necessary to validate an application;
  a determination unit configured to determine, based on the stored configuration information and the configuration information acquired by the acquisition unit, whether the image forming apparatus includes configuration information necessary to validate the application; and
  a first transmission unit configured to, if the determination unit determines that the image forming apparatus includes the configuration information necessary to validate the application, transmit information to be used by the image forming apparatus to make a license issuance request to the image forming apparatus, and wherein the image forming apparatus further comprises:
  a reception unit configured to receive from the management apparatus the information to be used to make the license issuance request; and a validation unit configured to make the license issuance request to the management apparatus using the received information to acquire a license, and to validate the application to be applied to the image forming apparatus using the acquired license.

2. The information processing system according to claim 1, wherein the management apparatus further comprises:
a request reception unit configured to receive the license issuance request from the image forming apparatus, and
a second transmission unit configured to determine whether the number of remaining licenses that correspond to the received license issuance request is zero, and configured to transmit the license to the image forming apparatus if it is determined that the number of the remaining licenses is not zero.

3. The information processing system according to claim 1, wherein the determination unit included in the management apparatus is configured to determine whether information relating to hardware/firmware included in the configuration information acquired by the acquisition unit satisfies a condition relating to hardware/firmware required to validate the application in the image forming apparatus,
wherein the determination unit is configured, if the information relating to hardware/firmware satisfies the condition relating to hardware/firmware, to determine that the condition for validating the application in the image forming apparatus is satisfied, and
wherein the determination unit is configured, if the information relating to hardware/firmware does not satisfy the condition relating to hardware/firmware, to determine that the condition for validating the application in the image forming apparatus is not satisfied.

4. The information processing system according to claim 1, wherein, the image forming apparatus further comprises a request unit configured to issue a request for acquiring the application after acquiring the license from the management apparatus.

5. The information processing system according to claim 1, wherein the configuration information of the device is information relating to hardware/firmware of the device.

6. The information processing system according to claim 1, wherein, if the determination unit determines that the image forming apparatus does not include the configuration information necessary to validate the application, the first transmission unit does not transmit the information to be used by the image forming apparatus to make the license issuance request to the image forming apparatus.

7. A method for information processing executed in an information processing system that includes an image forming apparatus and a management apparatus, the management apparatus being configured to manage the image forming apparatus, the method comprising:
causing the image forming apparatus to determine whether there is any change in configuration information of a device provided in the image forming apparatus; and
causing the image forming apparatus to transmit the changed configuration information to the management apparatus via a network, if it is determined that there is a change in the configuration information;
causing the management apparatus to acquire the configuration information from the image forming apparatus;
causing the management apparatus to store configuration information necessary to validate an application;
causing the management apparatus to determine, based on the stored configuration information and the acquired configuration information, whether the image forming apparatus includes configuration information necessary to validate the application;
causing the management apparatus to transmit information to be used by the image forming apparatus to make a license issuance request to the image forming apparatus, if it is determined that the condition for validating the application in the image forming apparatus is satisfied; and
wherein the image forming apparatus further comprises:
causing a reception unit configured to receive from the management apparatus the information to be used to make the license issuance request; and
causing a validation unit configured to make the license issuance request to the management apparatus using the received information to acquire a license, and to validate the application to be applied to the image forming apparatus using the acquired license.

\* \* \* \* \*